United States Patent [19]
Calvert

[11] 3,981,066
[45] Sept. 21, 1976

[54] METHOD AND APPARATUS FOR INSERTING SEAL RINGS INTO RESTRICTED GROOVES

[75] Inventor: Martin A. Calvert, Oakland, Calif.

[73] Assignee: Grove Valve and Regulator Company, Oakland, Calif.

[22] Filed: Nov. 11, 1974

[21] Appl. No.: 522,335

[52] U.S. Cl. .................................. 29/451; 29/235
[51] Int. Cl.² ........................................ B23P 11/02
[58] Field of Search ............ 29/235, 270, 283, 450, 29/451; 251/DIG. 1

[56] References Cited
UNITED STATES PATENTS

| | | |
|---|---|---|
| 2,958,124 | 11/1960 | Hardy .............................. 29/235 |
| 3,191,628 | 6/1965 | Kirkwood et al. ............. 251/DIG. 1 |
| 3,203,664 | 8/1965 | Vernooy ........................ 251/DIG. 1 |
| 3,457,624 | 7/1969 | Sullivan et al. ....................... 29/450 |

FOREIGN PATENTS OR APPLICATIONS 893,757  4/1962  United Kingdom .................. 29/450

*Primary Examiner*—James L. Jones, Jr.
*Attorney, Agent, or Firm*—Melvin R. Stidham

[57] ABSTRACT

Apparatus for inserting a relatively hard seal ring into a circular groove with a restricted opening, comprising an annular funneled chute formed by inner and outer annular members and an intermediate push ring on which they are slideably mounted. The outer member may be retracted against springs whereby the seal ring may be placed over a conical surface of the inner ring.

2 Claims, 8 Drawing Figures

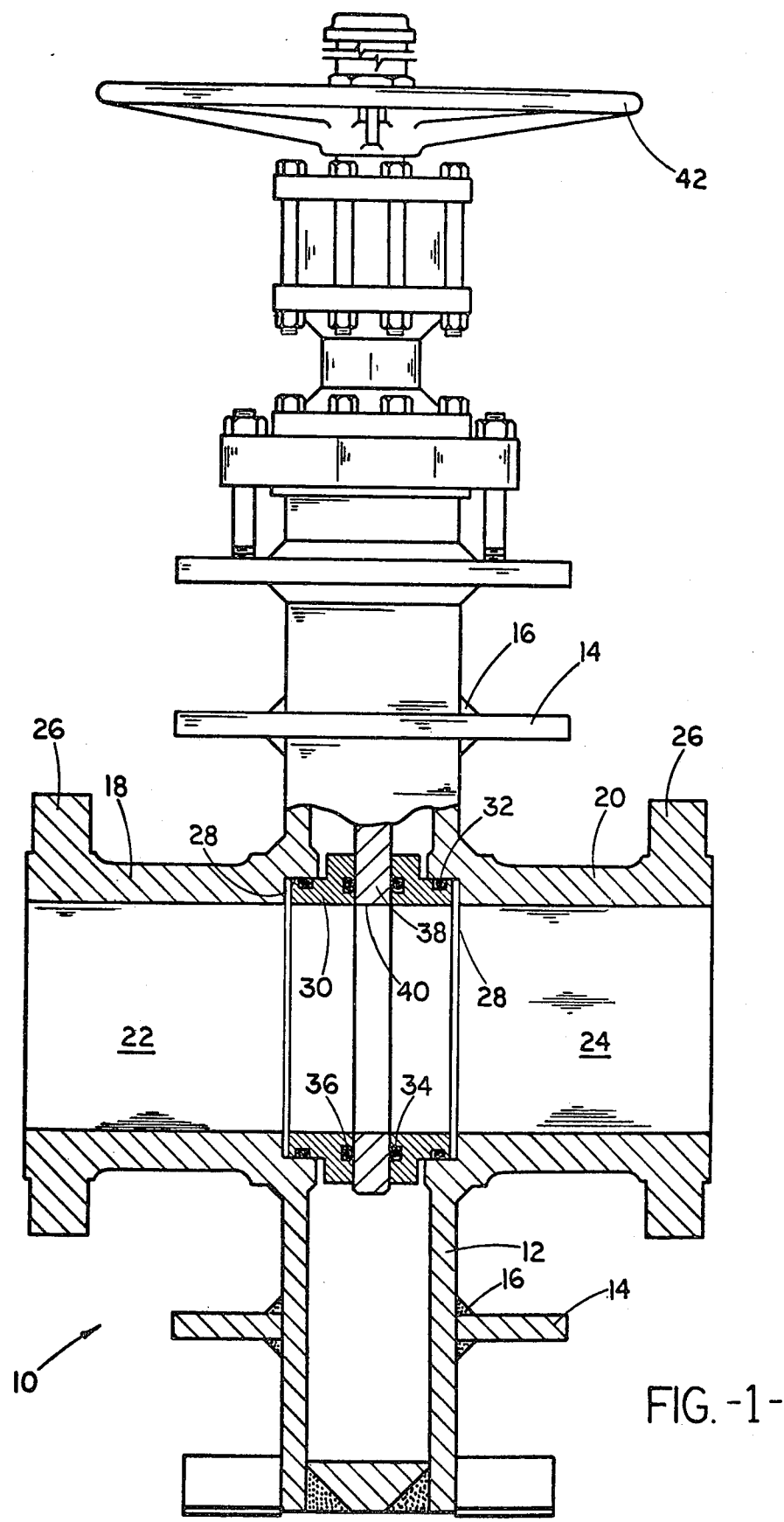
FIG.-1-

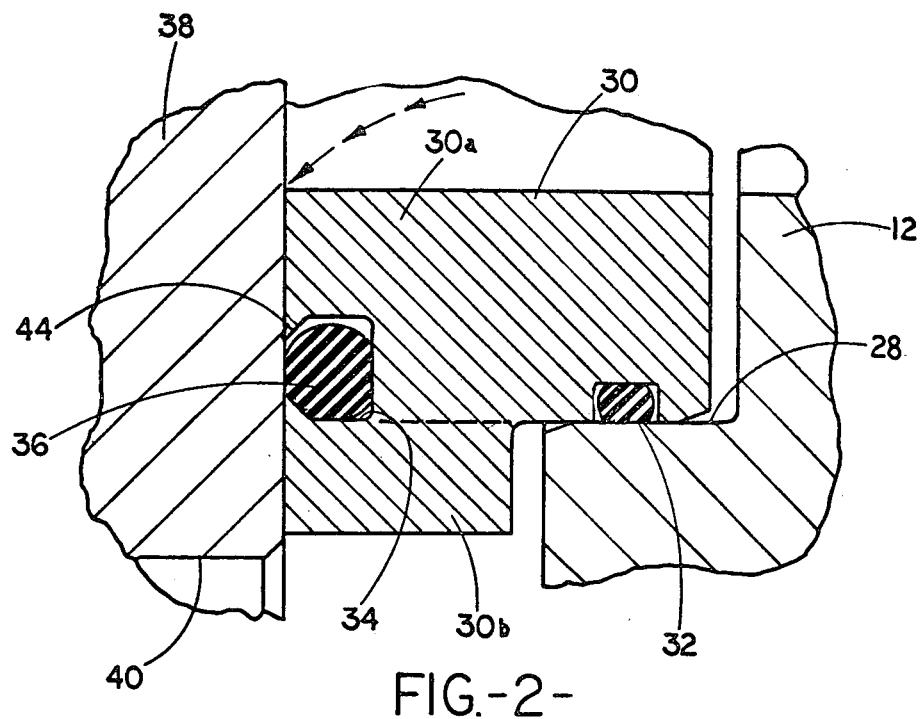
FIG.-2-
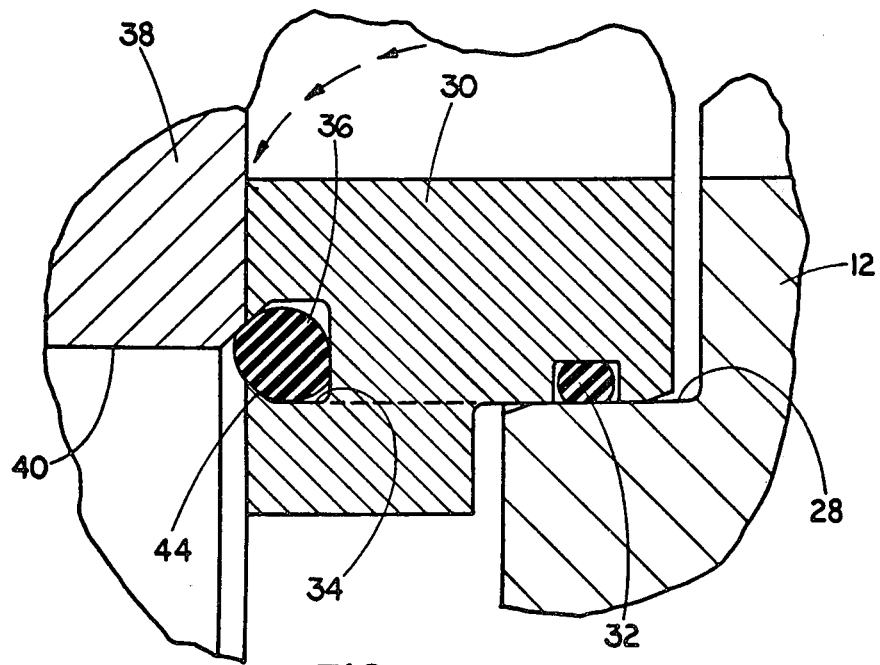
FIG-3-

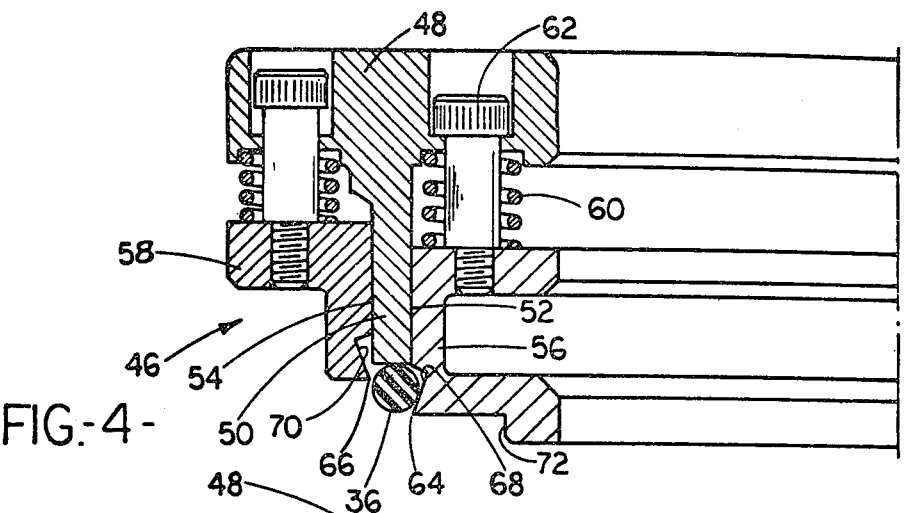
FIG.-4-
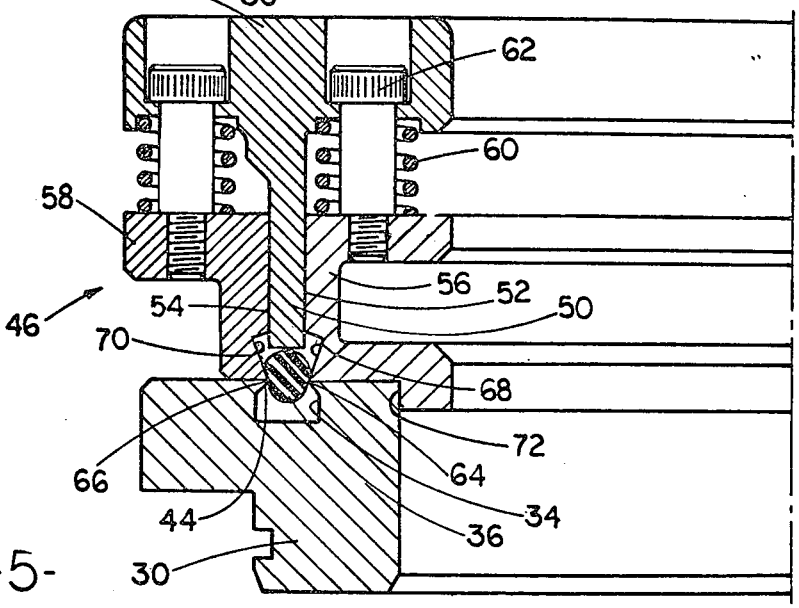
FIG.-5-
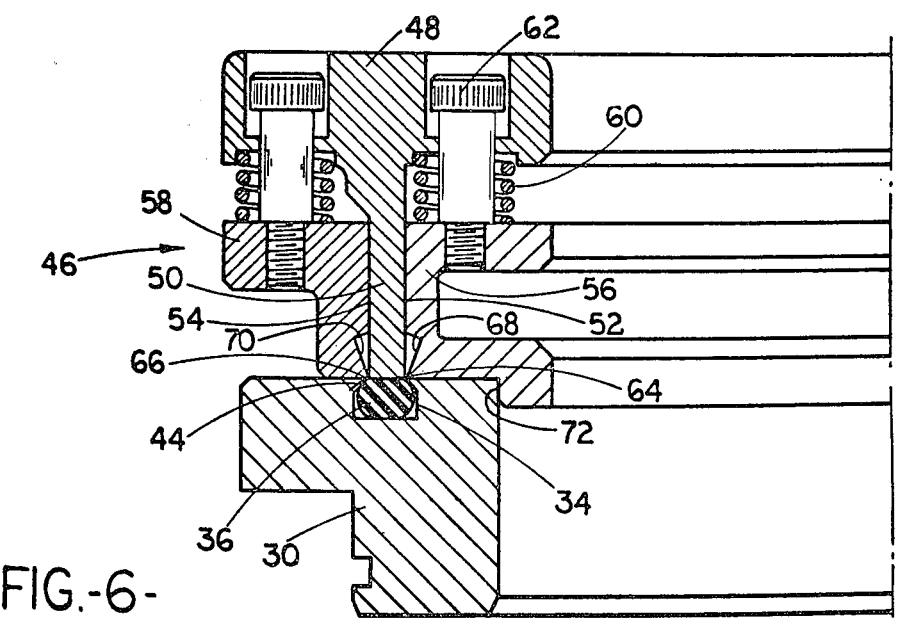
FIG.-6-

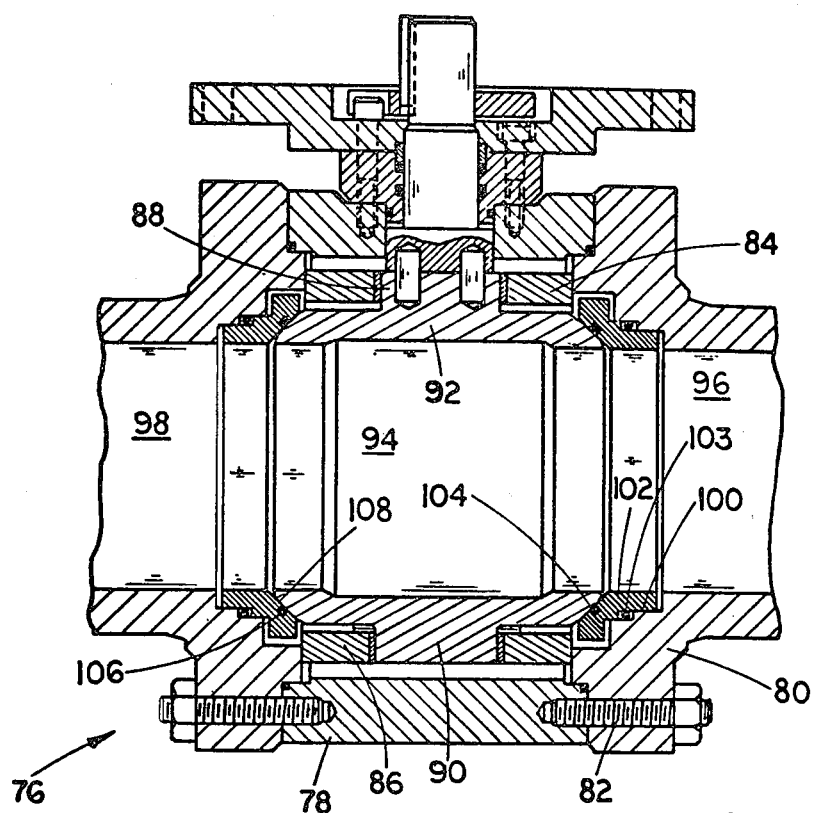
FIG-7-
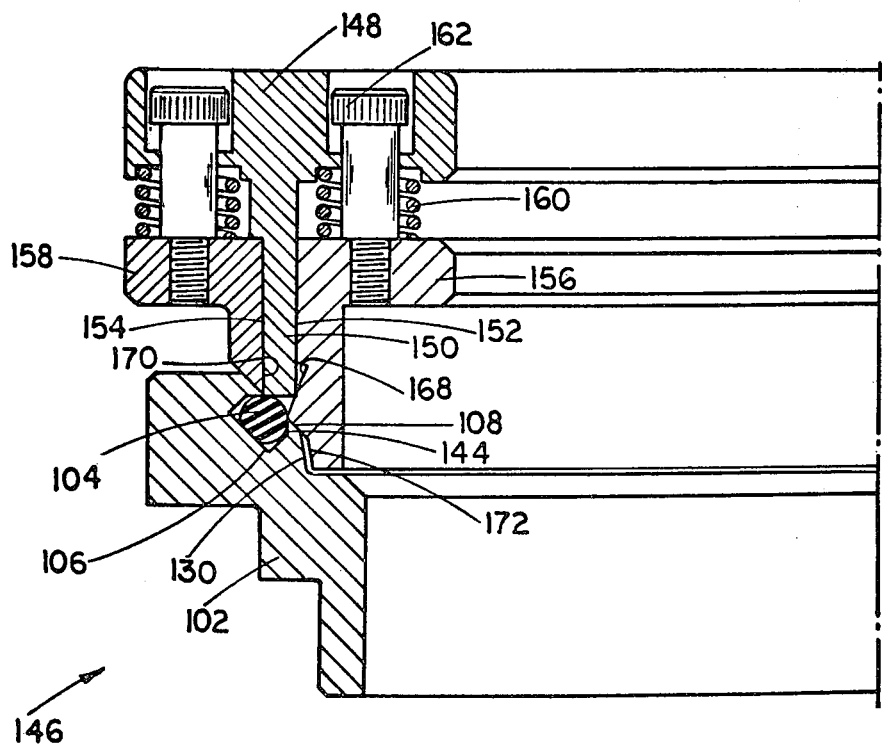
FIG.-8-

3,981,066

METHOD AND APPARATUS FOR INSERTING SEAL RINGS INTO RESTRICTED GROOVES

BACKGROUND OF THE INVENTION

A resilient seal of the O-ring type has proven to be a very effective sealing medium in a number of valves, including gate valves and ball valves. In sealing, the pressure of the fluid acting against the seal ring is transmitted through the resilient material thereof to form a pressure seal against the opposing working surface. However, when the valve is initially moved to its open position there is a tendency for the seal ring to maintain its seal and follow the opposing working surface as it is moved away from the groove in which the seal ring is carried. This, coupled with the force of the initial jet of high pressure fluid, has a tendency to dislodge the seal from the groove in which it is normally carried. Various venting means and structural provisions have been devised to prevent seal ring dislodgement and, among them, are the provision of restraining lips at the opening of the seal ring groove and the use of relatively hard materials in the seal ring itself. The restraining lips with the hard material are effective in reducing the liklihood of seal ring dislodgement but, by the same token, make seal ring installation during manufacturing and servicing much more difficult. Accordingly, the seat rings in which the seal rings are carried are generally formed as a two-piece assembly whereby the seal ring may be placed over the inner seat ring and the outer seat ring mounted over the installed seal ring and inner seat ring. However, the machining and precise finishing of two seat ring components for assembly render manufacturing costs execessive and it is highly desirable to have one-piece seat ring in which a seal of the O-ring type may be installed.

OBJECTS OF THE INVENTION

It is an object of this invention to provide apparatus for installing a seal of the O-ring type in a one-piece seat ring. It is a further object of this invention to provide apparatus for installing a relatively hard seal of the O-ring type into an annular groove with a restricted opening. It is a further object of this invention to provide apparatus for installing a relatively hard seal of the O-ring type into a groove having restraining lips at the opening thereof. Other objects and advantages of this invention will become apparent form the description to follow when read in conjunction with the accompanying drawings.

BRIEF SUMMARY OF THE INVENTION

In carrying out this invention, there is provided a three-piece asembly having means for positioning it coaxially on a one-piece seat ring into which a seal of the O-ring type is to be installed. The assembly is made up of inner and outer guide rings which are slideably mounted on an intermediate push ring. Spring members normally bias the guide rings to an extended position wherein the push ring is retracted away from the annular faces of the guide rings. At least one of the guide rings has a tapered guide surface which, with the guide surface of the other ring forms a funneled chute decreasing in dimension from a relatively wide seal ring loading space to a narrow delivery opening which is the width of the restricted seal ring groove. The outer guide ring may be retracted against the spring means to leave the inner guide surface free whereby a seal ring may be placed over it and around the small diameter portion of the tapered guide surface, then, the outer ring is extended to enclose the seal ring in the delivery chute and the apparatus is centered on the seat ring by engagement of complementary surfaces thereon. Finally the push ring is depressed to drive the seal ring from its loading space through the funneled chute and into the groove.

BRIEF DESCRIPTION OF THE DRAWINGS

In the drawings:

FIG. 1 is an elevation view partially in section of a gate valve utilizing seals of the O-ring type;

FIGS. 2 and 3 are enlarged partial section views of the sealing means of the gate valve;

FIGS. 4, 5 and 6 are enlarged section views of a seal installing apparatus comprising features of the invention;

FIG. 7 is a section view of a ball valve utilizing seals of the O-ring type; and FIG. 8 is an enlarged section view of seal ring installing apparatus for use with the ball valve seat ring.

DESCRIPTION OF PREFERRED EMBODIMENTS

The Embodiment of FIGS. 1 to 6

Referring now to FIG. 1 with greater particularity, there is shown a gate valve 10 which may include a rectangular valve body 12 formed of rolled steel shapes with reinforcing ribs 14 welded thereon at 16 to strengthen the rectangular body 12 against internal pressures. Carried on the valve body 12 are hub members 18 and 20 with upstream and downstream flow passages 22 and 24 therethrough and suitable means such as the flanges 26 shown for installing the valve 10 in a pipeline (not shown). Of course, tbe particular body construction is shown by way of illustration only, and the valve sealing means to which this invention is directed will function in valve bodies which are cast or otherwise formed.

Slideably carried in cylindrical recesses 28 in the valve body 12, is a pair of seat rings 30, each of which has an O-ring 32 in a trailing portion thereof to seal between the seat ring 30 and the cylindrical recess wall of the body and, carried in a circular groove 34 in the leading face of the seat ring 30 is the main sealing ring 36 which is of the O-ring type and which seals against valve gate 38. While a circular cross-section O-ring is illustrated it will become apparent that this inventions is applicable to seal rings of the O-ring type having a range of configurations. The valve gate 38 is moveable by conventional stem means (not shown) between the open position shown wherein a flow passageway 40 therein is aligned with the seat rings 30 and the upstream and downstream flow passages 22 and 24, and a closed position wherein the flow passageway 40 is disposed in the lower portion of the valve body 12. Any suitable means such as the hand wheel 42 shown may be provided for oprating the valve stem to raise and lower the gate 38.

Referring now to FIGS. 2 and 3, the structure of the seat rings 30 is shown in greater detail. Carried within the forward circular groove 34 is the main seal ring 36 so that, when the valve gate 38 is in the closed position shown in FIG. 2, pressure within the valve body 12 acts through the resilient material of the seal ring 36 to urge it firmly into sealing engagement with the valve gate 38. Then when the valve gate 38 is moved to its initial open position shown in FIG. 3, there is a tendency for the seal ring 36 to maintain the sealing relationship and to follow the valve gate 38 as it moves upwards, tending to become dislodged from the groove 34. This situation is aggravated by the sudden jet of high pressure fluid surging through the slightly open gate, further tending to dislodge the O-ring type seal from its recess.

In order to prevent such seal ring dislodgement, a number of inventions and improvements have been directed to this problem. Among the features devised for this purpose are those shown in U.S. Pat. No. 3,109,623 granted Nov. 5, 1973, to Austin U. Bryant. Among other things, it has been found desirable to provide restraining lips 44 at the opening to the seal ring recess 34, which reduces the width of the opening to a dimension considerably less than the cross-sectional diameter of the seal ring 36. Coupled with this, the seal rings may be formed of rather hard rubber, up to 100 durometer on the Shore A scale, and even relatively hard plastics such as nylon.

The combination of the restraining lips 44 and the relatively hard materials used in forming the seal ring, function to greatly inhibit any tendency for the seal rings to become dislodged. However, they also make it more difficult to insert the seal ring into the recess. Accordingly, it has heretofore been customary to form the seat ring as an assembly of two rings, inner and outer seat rings 30a and 30b, as indicated by the dotted line in FIG. 2. Then, in placing the O-ring type seal 36, it is merely stretched over the inner restraining lip 44 and onto the inner seat ring 30a and then the outer seat ring 30b is placed over the seal ring 36 and inner seat ring 30b, with suitable means (not shown) securing them in the assembled position. Such inner and outer seat ring assemblies have proven to be successful, but the cost of producing and finishing two separate rings to fit precisely together is excessive. Accordingly, it would be highly desirable to form a seat ring assembly in a single piece, as shown.

Referring now to FIGS. 4 to 6, inclusive, there is shown the apparatus 46 for placing a seal ring 36 in a circular recess of a one-piece seat ring 30 wherein the seal ring 36 may be of a relatively hard material and wherein the restraining lips 44 restrict the width of the opening.

As there shown, the seal ring installation device 46 includes a mounting ring 48 having formed integrally therewith an annular push ring 50 with cylindrical inner and outer surfaces 52 and 54. Slideably carried on the inner surface 52 is an inner guide ring 56 and slideably carried on the outer cylindrical surface is an outer guide ring 58. Suitable spring means 60 carried around cap screws 62 or the like, which support the inner and outer guide rings 56 and 58 on the mounting ring 48, normally bias the guide members 56 and 58 to their extended positions shown in FIG. 5 wherein the push ring 50 is retracted from the delivery edges 64 and 66 of the inner and outer guide rings 56 and 58. As shown, the outer surface of the inner guide ring is tapered at 68 toward the delivery edge 64, the inner wall of a seal ring delivery chute. Similarly, the outer ring may be tapered at 70 to form the outer wall of the delivery chute. Hence, the delivery chute funnels along sides 68 and 70 from a relatively wide seal ring loading space to a narrow delivery opening between edges 64 and 66.

An inner annular shoulder 72 on the inner member 56 nests within the seat ring 30 to position the seal ring installation device 46 coaxially with the seat ring.

In operation, the outer member 58 may be raised against the bias of springs 60 to the position shown in FIG. 4 so as to expose the inner tapered surface 68 and permit placement of an O-ring type seal 36 over the inner member 56 and around the reduced diameter portion of the inner delivery chute surface 68. Then, the outer guide member 58 is allowed to extend to the position shown in FIG. 4 wherein the seal ring is completely contained in the delivery chute. The annular shoulder 72 on the inner member is seated within the seat ring 30 to dispose the entire assembly coaxially therewith. Finally, the mounting ring 48 is depressed to extend the push ring 50 and force the O-ring down through the delivery chute 68, 70 to squeeze it to a narrow width across its radial diameter and then force it between the restraining lips 44 and into the annular groove, wherein it is allowed to expand to its normal configuration. It is to be understood that the terms "annular" or "circular" as applied to the seal ring groove are intended to be broad enough to include, for example, an oval groove.

The Embodiment of FIGS. 7 and 8

Referring now to FIG. 7 there is shown a ball valve 76, the body of which may comprise a rigid body tube 78 to which end closures 80 are secured as by means of bolts 82. Clamped between the end closures 80 are upper and lower bearing blocks 84 and 86 which rotatably received journals 88, 90 formed integrally with the valve ball 92. A flow passage 94 through the ball 92 is aligned with upstream and downstream flow passages 96 and 98 when the ball 92 is in its open position shown. Slideably carried in recesses 100 formed in the end closures 80 are the valve seats 102 with a tail O-ring 103 being provided on each to seal between the seat ring and the body and a main resilient seal ring 104 being carried in an annular recess 106 in the conical leading face 108 of the seat ring 102.

In FIG. 8 there is shown a seal ring installing apparatus 146 similar to that shown in FIGS. 4 to 6, though adapted to accommodate the conical leading face 108 of the seat ring. Accordingly, corresponding components will be identified by like reference numerals proceeded by the hundreds digit. As there shown, the mounting ring 148 has a protruding push ring 150, and on the inner and outer surfaces 152, 154 of the push ring 150 are carried the inner and outer rings 156 and 158 for axial slideable movement thereon. Again, springs 160 carried around cap screws 162 are provided normally to bias the inner and outer rings to their extended positions, or conversely, to bias the push ring 150 to its retracted position. In operation, after the outer ring 158 is retracted to enable the resilient seal ring 104 to be placed on the inner ring 156, the outer ring 158 is again extended and the installing device 146 is placed on the seat ring 102 with the lower protruding shoulder 182 thereon seated in an accommodating recess 130 in the seat ring 102. Then, the push ring 148 is depressed to the position shown in FIG. 8 forcing the seal ring 104 down the tapered chute 168, 170 to squeeze it across its radial diameter and force it through the restricted opening between the restraining lips 144.

While this invention has been described in conjunction with preferred embodiments thereof, it is obvious that modifications and changes therein may be made by those skilled in the art without departing from the spirit and scope of this invention as defined by the Claims appended hereto.

What is claimed is:

1. The method of inserting and retaining a seal ring of the O-ring type in a circular groove in a seat ring for a high pressure valve, comprising the steps of:
providing a seat ring with an annular groove having side walls faced apart a fixed distance and retaining lips extending inward toward each other from said sidewalls at the outer portions thereof to form a restricted opening;
selecting a seal ring of the O-ring type of a relatively hard material, normally of approximately the same mean diameter as said annular groove, and having a cross-section radially thereof wider than said restricted opening but narrow enough to fit loosely between said groove sidewalls;
placing a funneled annular chute having a delivery opening approximately as wide as said restricted opening over and in alignment with said restricted opening; and
squeezing said seal ring around the circumference thereof across said cross-section and parallel to said restricted opening by pushing it axially through said annular chute and past said retaining lips.

2. The method defined by claim 1 wherein:
said annular chute has an initial opening wide enough to accommodate said seal ring freely.

* * * * *